United States Patent
Kezobo et al.

(10) Patent No.: US 8,878,474 B2
(45) Date of Patent: Nov. 4, 2014

(54) MOTOR CONTROL DEVICE, CURRENT CONTROL METHOD APPLIED TO MOTOR CONTROL DEVICE, AND ELECTRIC POWER STEERING DEVICE USING MOTOR CONTROL DEVICE

(75) Inventors: Isao Kezobo, Chiyoda-ku (JP); Kosuke Nakano, Chiyoda-ku (JP); Yoshihito Asao, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 94 days.

(21) Appl. No.: 13/612,150

(22) Filed: Sep. 12, 2012

(65) Prior Publication Data
US 2013/0200827 A1   Aug. 8, 2013

(30) Foreign Application Priority Data
Feb. 7, 2012   (JP) .................................. 2012-024178

(51) Int. Cl.
  *H02H 7/08*   (2006.01)
(52) U.S. Cl.
  USPC ............ 318/400.21; 318/400.22; 318/400.26; 318/434
(58) Field of Classification Search
  USPC .......... 318/400.01, 400.21, 400.26, 491, 434; 180/400, 65.1, 65.31, 65.8
  See application file for complete search history.

(56) References Cited

U.S. PATENT DOCUMENTS

| | | | |
|---|---|---|---|
| 6,158,553 A * | 12/2000 | Oshima et al. | 187/293 |
| 7,277,304 B2 * | 10/2007 | Stancu et al. | 363/71 |
| 8,248,010 B2 * | 8/2012 | Mukai et al. | 318/400.21 |
| 8,410,740 B2 * | 4/2013 | Suzuki | 318/490 |
| 8,436,568 B2 * | 5/2013 | Mukai et al. | 318/490 |
| 8,528,689 B2 * | 9/2013 | Uryu | 180/446 |
| 8,569,981 B2 * | 10/2013 | Nakamura et al. | 318/400.02 |
| 8,659,260 B2 * | 2/2014 | Mukai et al. | 318/801 |
| 2011/0156627 A1 * | 6/2011 | Nakamura et al. | 318/400.22 |
| 2011/0156629 A1 | 6/2011 | Satou et al. | |
| 2011/0204839 A1 * | 8/2011 | Mukai et al. | 318/724 |

FOREIGN PATENT DOCUMENTS

JP   2011-131860 A   7/2011

* cited by examiner

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

Provided is a motor control device (10) for controlling a motor (5) provided with a plurality of sets of windings, in which, when a current control unit (23) detects a short-circuit failure as a primary failure, the current control unit (23) continues the control, and, further, when the current control unit (23) detects a secondary failure, the current control unit (23) provides control of opening a power supply relay (3). Accordingly, in a case where a failure of a winding of a motor or an inverter occurs, a torque pulsation is restrained and a sufficient output torque is provided, and further, in a case where a secondary failure occurs, excessive heat generation and current consumption are prevented and the cost of the device is reduced.

10 Claims, 11 Drawing Sheets

MOTOR CONTROL DEVICE, CURRENT CONTROL METHOD APPLIED TO MOTOR CONTROL DEVICE, AND ELECTRIC POWER STEERING DEVICE USING MOTOR CONTROL DEVICE

BACKGROUND OF THE INVENTION

1. Field of the Invention

The present invention relates to a motor control device for controlling a multi-phase motor including a plurality of sets of windings, a current control method applied to a motor control device, and an electric power steering device using a motor control device.

2. Description of the Related Art

As a motor control device for controlling a conventional multi-phase motor including a plurality of sets of windings, there is a motor control device having a configuration in which a motor includes two sets of windings, and the motor control device includes two inverters for controlling currents flowing through the respective sets of windings, thereby independently controlling the currents (for example, refer to Japanese Patent Application Laid-open No. 2011-131860).

The motor control device according to Japanese Patent Application Laid-open No. 2011-131860 includes, in order to supply respective inverters with power from a power supply, power supply relays for electrical connection/disconnection. When a failure occurs on a winding or an inverter on one side, the motor control device opens a power supply relay for the side on which the failure has occurred, thereby interrupting the connection to the power supply. The motor control device also controls the inverter on the normal side, thereby continuing an output of torque from the motor.

However, the conventional technology has the following problems.

In the example described in Japanese Patent Application Laid-open No. 2011-131860, a power supply relay connected to a failed inverter out of the plurality of inverters is opened. However, when a short-circuit failure occurs, a closed circuit through a portion of the short-circuit failure and a windings is formed, resulting in a circulating current that does not flow through the power supply. Then, this circulating current generates a torque acting in a direction of decelerating the rotation of the motor, namely a brake torque is generated. This brake torque is generated by a current that does not flow through the power supply, and cannot be restrained only by opening the power supply relay. Accordingly, there occurs a problem of a lack of torque.

Moreover, an advantage of opening a power supply relay on a failed side is that it is possible to prevent excessive heat generation and current consumption in the following case. That is, assume a case where a short-circuit failure of a switching element or a failure of ground fault or power-supply fault of an inverter or a winding occurs, and after a power supply relay on a failed side is opened, in a connection state in which the power supply relay on the failed side is not opened, a secondary failure further occurs in a pair of a winding and an inverter (hereinafter, also referred to as winding drive system) on the failed side, and the secondary failure is a short-circuit failure of the winding drive system.

In this case, via the two locations of the primary failure and the secondary failure, the positive electric potential and the negative electric potential of the power supply become a state close to a short circuit, which may lead to a state in which an excessive current is generated. As a result, excessive heat generation and current consumption possibly occur. Then, one method of providing an advantage of preventing this state from occurring is the method of opening the power supply relay on the failed side when a primary failure occurs, namely the method according to Japanese Patent Application Laid-open No. 2011-131860.

However, this method requires as many power supply relays as the number of the plurality of winding drive systems, and there is a problem of an increase in price of the device.

SUMMARY OF THE INVENTION

The present invention has been made in order to solve the above-mentioned problems, and therefore has an object to provide a motor control device, a current control method applied to a motor control device, and an electric power steering device using a motor control device, which are capable of, in a case where a failure of a winding of a motor or an inverter, such as a short-circuit failure of a switching element, a ground-fault failure of a winding in one phase or a wire connecting an inverter and a winding with each other, a short-circuit failure between two phases, or the like occurs, and further in a case where a secondary failure occurs in a winding drive system on the failed side, preventing excessive heat generation and current consumption, reducing the cost of the device, and restraining the brake torque generated when the primary failure is a short-circuit failure, thereby providing a sufficient output torque.

According to an exemplary embodiment of the present invention, there is provided a motor control device for supplying from a power supply and controlling a current to flow through a motor provided with a plurality of sets of windings, comprising: a plurality of inverters comprising a switching element in each of phases of the plurality of sets of windings for controlling a voltage applied to the each of the phases, thereby controlling a current to be supplied from the power supply to the each of the phases of the plurality of sets of windings; a power supply relay provided between the power supply and the plurality of inverters for disconnecting an electrical connection; and current control means for providing, depending on a target value of a torque to be generated by the motor, each of the plurality of inverters with a voltage command corresponding to the voltage, thereby controlling the current to flow through the plurality of sets of windings, wherein: the current control means comprises: primary failure detection means for detecting a primary failure of any one of the plurality of sets of windings and the plurality of inverters, and secondary failure detection means for detecting, after the primary failure is detected, a secondary failure occurring in any one of a winding and an inverter in a system in which the primary failure has occurred; and the current control means is configured to: when the primary failure detection means detects, in any one of the plurality of inverters and a part of the plurality of sets of windings, any one of a short-circuit failure, a ground-fault failure, and a power-supply-fault failure as the primary failure, continue control for an inverter on a normal side; and further, when the secondary failure detection means detects the secondary failure, open the power supply relay.

According to an exemplary embodiment of the present invention, there is also provided a current control method applied to a motor control device for supplying from a power supply and controlling a current to flow through a motor provided with a plurality of sets of windings, the motor control device comprising: a plurality of inverters comprising a switching element in each of phases of the plurality of sets of windings for controlling a voltage to be applied to the each of the phases, thereby controlling a current to be supplied from the power supply to the each of the phases of the plurality of sets of windings; a power supply relay provided between the power supply and the plurality of inverters for disconnecting an electrical connection; and current control means for providing, depending on a target value of a torque to be generated by the motor, each of the plurality of inverters with a voltage command corresponding to the voltage, thereby controlling the current to flow through the plurality of sets of windings, the current control method comprising: detecting, by the current control means, a primary failure of any one of the plurality of sets of windings and the plurality of inverters; detecting, by the current control means, after a the primary failure is detected, a secondary failure occurring in any one of a winding and an inverter in a system in which the primary failure has occurred; continuing, by the current control means, when in any one of the plurality of inverters and a part of the plurality of sets of windings, any one of a short-circuit failure, a ground-fault failure, and a power-supply-fault failure is detected in the detecting a primary failure as the primary failure, control for an inverter on a normal side; and opening, by the current control means, when the secondary failure is detected in the detecting a secondary failure, the power supply relay.

According to the motor control device, the current control method applied to a motor control device, and the electric power steering device using a motor control device of the present invention, there is provided means for detecting the secondary failure by a failure detection method depending on the primary failure state. Therefore, it is possible to provide the motor control device, the current control method applied to a motor control device, and the electric power steering device using a motor control device, which are capable of, in a case where a failure of a winding of a motor or an inverter, such as a short-circuit failure of a switching element, a ground-fault failure of a winding in one phase or a wire connecting an inverter and a winding with each other, a short-circuit failure between two phases, or the like occurs, and further in a case where a secondary failure occurs in a winding drive system on the failed side, preventing excessive heat generation and current consumption, reducing the cost of the device, and restraining the brake torque generated when the primary failure is a short-circuit failure, thereby providing a sufficient output torque.

DETAILED DESCRIPTION OF THE PREFERRED EMBODIMENTS

Figure 1:
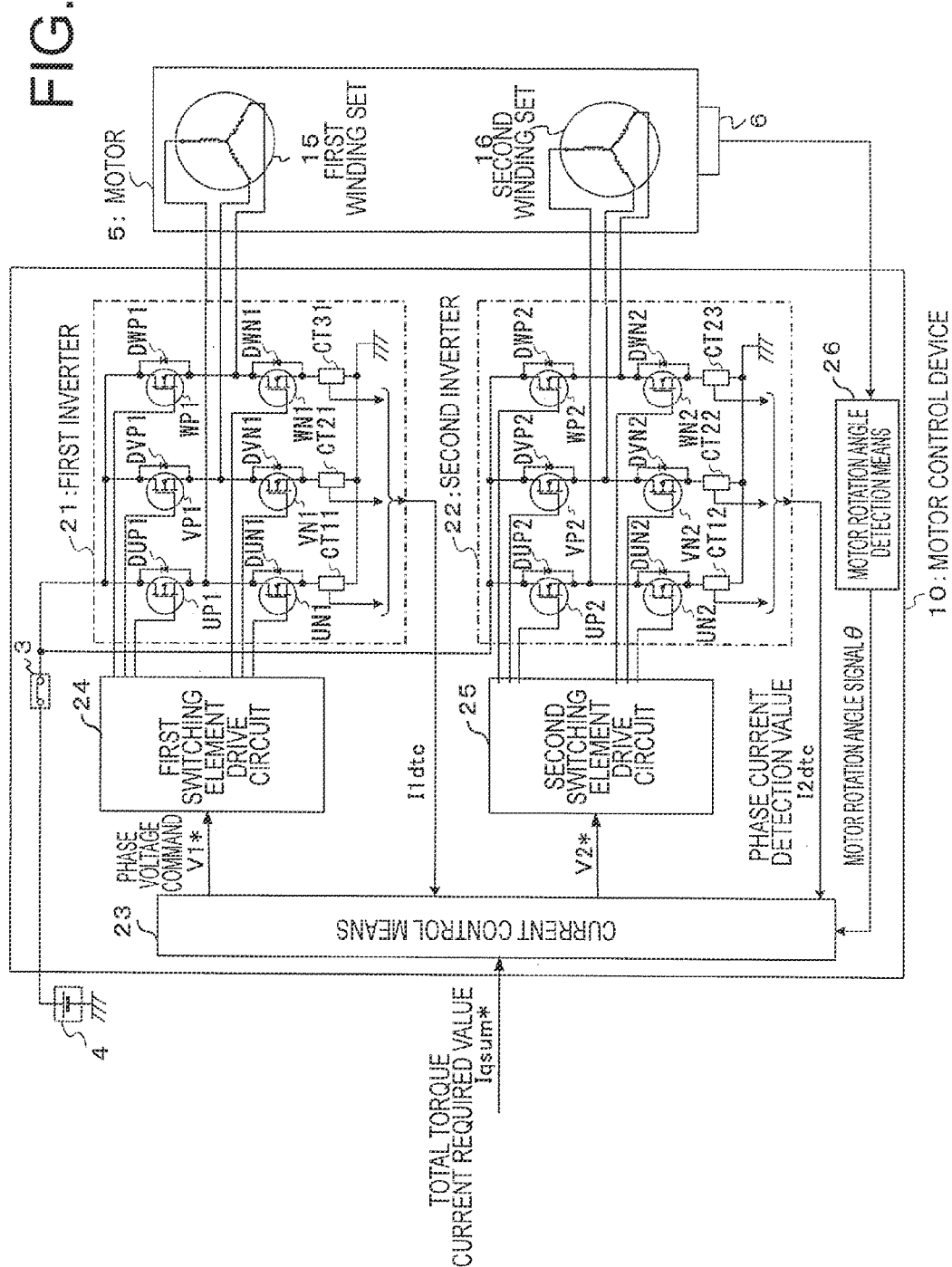
FIG. 1 is a schematic block diagram illustrating an overall configuration including a motor control device according to a first embodiment of the present invention.

A description is now given of a motor control device, a current control method applied to a motor control device, and an electric power steering device using a motor control device according to preferred embodiments of the present invention referring to the drawings.

First Embodiment

FIG. 1 is a schematic block diagram illustrating an overall configuration including a motor control device according to a first embodiment of the present invention. Note that, FIG. 1 illustrates a power supply 4, a motor 5, and a motor rotation angle sensor 6 for detecting a rotation angle of the motor 5 in addition to the motor control device 10.

The motor 5 includes a first winding set 15 constituted by three phases, U1, V1, and W1, and a second winding set 16 constituted by three phases, U2, V2, and W2. Then, the each of the winding sets 15 and 16 connects the phases as the star connection. Those plurality of winding sets 15 and 16 constitute a stator (not shown). The motor 5 is constituted by this stator, and a rotor and a rotation shaft fixed to the rotor, which are not shown.

Note that, in the following, a description is given of an example in which the present invention is applied to a permanent-magnet synchronous motor in which each of the winding sets has three phases and permanent magnets are disposed in the rotor. However, the present invention is not limited to this example, and can also be used for a motor rotating for driving by a multi-phase current having three or more phases.

The motor control device 10 controls voltages applied to the windings of the motor 5, to thereby supply the motor 5 with electric power from the power supply 4 and control currents to flow through the windings. Accordingly, the motor control device 10 controls an output torque of the motor 5, which is approximately proportional to the currents.

Then, the motor control device 10 is constituted by a power supply relay 3, a first inverter 21, a second inverter 22, current control means 23, a first switching element drive circuit 24, a second switching element drive circuit 25, and motor rotation angle detection means 26.

The first inverter 21 is constructed by six switching elements UP1, VP1, WP1, UN1, VN1, and WN1, six diodes DUP1, DVP1, DWP1, DUN1, DVN1 and DWN1, which are connected to the respective switching elements in parallel, and current detection circuits CT11, CT21, and CT31 for the respective three phases U, V, and W.

Similarly, the second inverter 22 is constructed by six switching elements UP2, VP2, WP2, UN2, VN2, and WN2, six diodes DUP2, DVP2, DWP2, DUN2, DVN2, and DWN2, which are connected to the respective switching elements in parallel, and current detection circuits CT12, CT22, and CT32 for the respective three phases, U, V, and W.

The motor rotation angle detection means 26 in the motor control device 10 receives a signal from the motor rotation angle sensor 6, thereby calculating a rotation angle signal θ of the motor 5. Moreover, the current control means 23 acquires detection values Iu1*dtc*, Iv1*dtc*, Iw1*dtc*, Iu2*dtc*, Iv2*dtc*, and Iw2*dtc* of phase currents flowing through the respective phases of the motor 5, which are detected by the current detection circuits CT11, CT21, CT31, CT12, CT22, and CT32, respectively.

Note that, in FIG. 1, the values on the first winding side Iu1*dtc*, Iv1*dtc*, and Iw1*dtc* are denoted by I1*dtc*, and the values on the second winding side Iu2*dtc*, Iv2*dtc*, and Iw2*dtc* are denoted by I2*dtc*. Moreover, in FIG. 1, the case where the motor rotation angle sensor 6 and the motor rotation angle detection means 26 are provided is exemplified, but a configuration in which the motor rotation angle signal θ is acquired from a motor rotation angle estimated by estimation means, which is commonly carried out, may be adopted.

As described later, the current control means 23 determines phase voltage commands V1* and V2* based on a total torque current required value Iqsum*, which corresponds to a target of a motor torque, the phase current detection values I1*dtc* and I2*dtc* of the respective phases of the motor 5, and the motor rotation angle signal θ.

The first switching element drive circuit 24 applies the PWM modulation to a first phase voltage command V1*, thereby instructing the first inverter 21 to carry out a switching operation. Then, the first inverter 21 receives the switching operation signal, realizes chopper control for the switching elements UP 1, VP1, WP1, UN1, VN1, and WN1, and causes the currents to flow through the respective phases U1, V1, and W1 of the motor by means of the electric power supplied from the power source 4.

The second switching element drive circuit 25 and the second inerter 22 similarly cause the currents to flow through the respective phases U2, V2, and W2 based on the phase voltage command V2*. Note that the first inverter 21 and the second inverter 22 respectively correspond to the first winding set 15 and the second winding set 16.

The one power supply relay 3 is provided between the power supply 4 and the first inverter 21 and second inverter 22, and serves in a switching manner to electrically connect the power supply 4 and the inverters 21 and 22 with each other and to interrupt the electrical connection at once.

Figure 2:
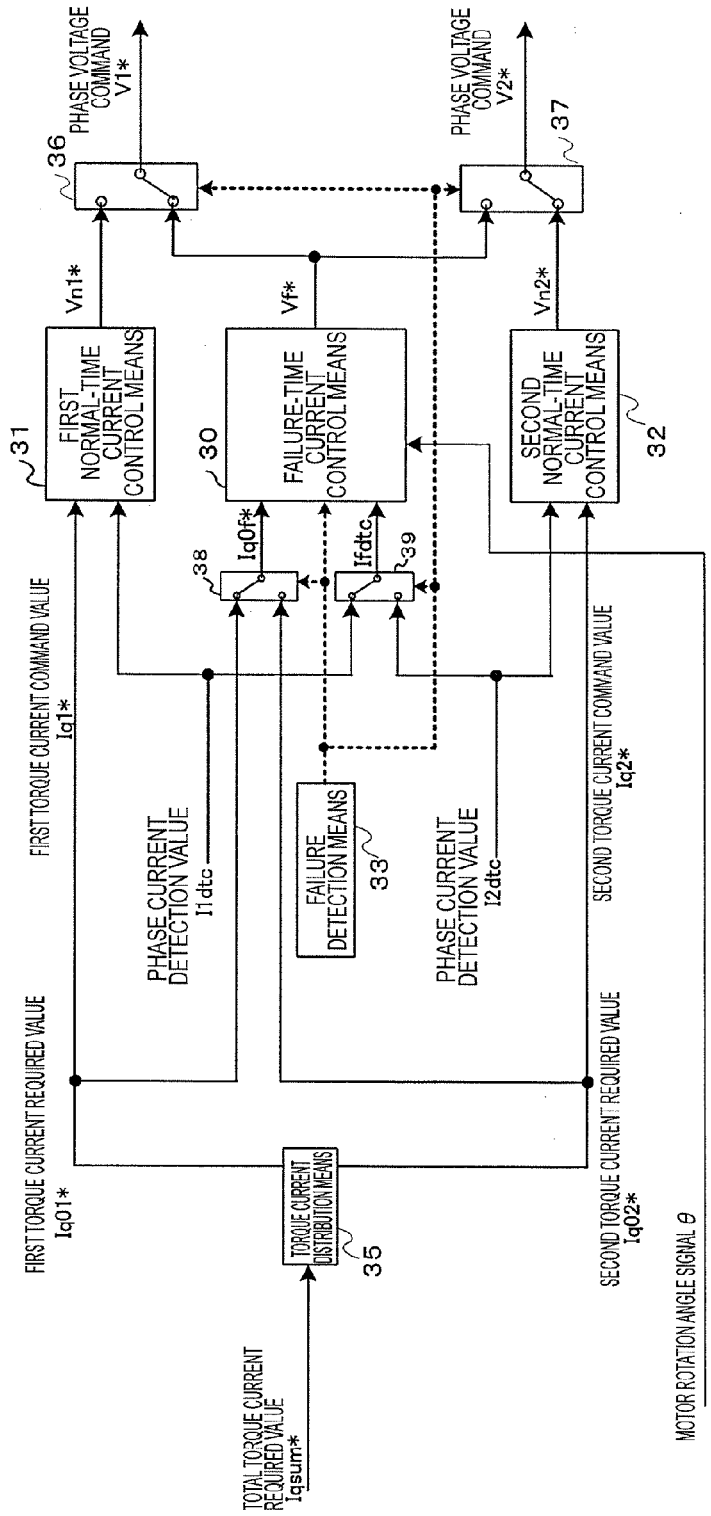
FIG. 2 is a configuration diagram of current control means according to the first embodiment of the present invention.

A detailed description is now given of an internal configuration of the current control means 23. FIG. 2 is a configuration diagram of the current control means 23 according to the first embodiment of the present invention. The current control means 23 illustrated in FIG. 2 includes failure-time current control means 30, first normal-time current control means 31, second normal-time current control means 32, failure detection means 33, torque current distribution means 35 and four switching means 36 to 39.

On this occasion, the first normal-time current control means 31 and the second normal-time current control means 32 are means for carrying out a normal control method used in a normal time. On the other hand, the failure-time current control means 30 is means used when a failure occurs. With this configuration, it is possible to switch the two types of control means so that the failure-time current control means 30 can control a pair of the windings and the inverter (hereinafter, also referred to as winding drive system) on a failed side out of the two systems of the windings and inverters.

The total torque current required value Iqsum* is distributed by the torque current distribution means 35 into a first torque current required value Iq01* and a second torque current required value Iq02* which are required values of torque respectively to be generated by a first winding drive system and a second winding drive system. According to the first embodiment, the respective required values of the distributed currents are set to halves of the total torque current required value Iqsum*. In other words, the setting is configured so that equivalent torques are generated by the respective systems, and a sum of them provides the output torque.

In the first system, in a normal time when no failure occurs, the first torque current required value Iq01* is set to the first torque current command value Iq1*. Note that, when a failure occurs, command shaping means (not shown) may be provided between Iq01* and Iq1*, thereby shaping the first torque current command value Iq1* based on the motor rotation angle signal θ. In the second system, similarly, the second torque current required value Iq02* is set to the second torque current command value Iq2*.

Then, the first normal-time current control means 31 outputs, based on the first torque current command value Iq1* and the phase current detection value I1*dtc*, a normal-time phase voltage command Vn1*. In the normal time, the switching means 36 selects the normal-time phase voltage command Vn1*, thereby inputting the normal-time phase voltage command Vn1*, as the first phase voltage command V1*, into the first switching element drive circuit 24.

Note that, the first normal-time current control means 31 and the second normal-time current control means 32 are, for example, configured as denoted by reference numeral 31*a* in a block diagram of FIG. 19 illustrated in WO 2005/091488 A1, and carry out the dq control, which is commonly used in the normal time, thereby realizing generation of a smooth motor torque.

The first torque current command value Iq1* is used as a q-axis current command in the dq control. Note that, in FIG. 2, lines for inputting the motor rotation angle signal θ to the first normal-time current control means 31 and the second normal-time current control means 32 are not illustrated, but lines may be provided for input for the coordinate conversion, which is usually carried out in the dq control. On this occasion, the q-axis current is a current component proportional to the torque, and, in the description of the first embodiment, is also referred to as torque current. Moreover, the other d-axis current for controlling the field magnet magnetic flux is controlled to be zero according to the first embodiment, but another value may be used.

On the other hand, in the normal time, in the second system, similarly based on the second torque current command value Iq2*, the dq control is carried out by the second normal-time current control means 32, and the normal-time phase voltage command Vn2* is input, as a second phase voltage command V2*, into the second switching element drive circuit 25.

In this way, in the normal time, the torque current in the first winding drive system and the torque current in the second winding drive system are respectively controlled so that those torque currents respectively track the first torque current required value Iq01* and the second torque current required value Iq02*, resulting in a desired output torque.

Figure 3:
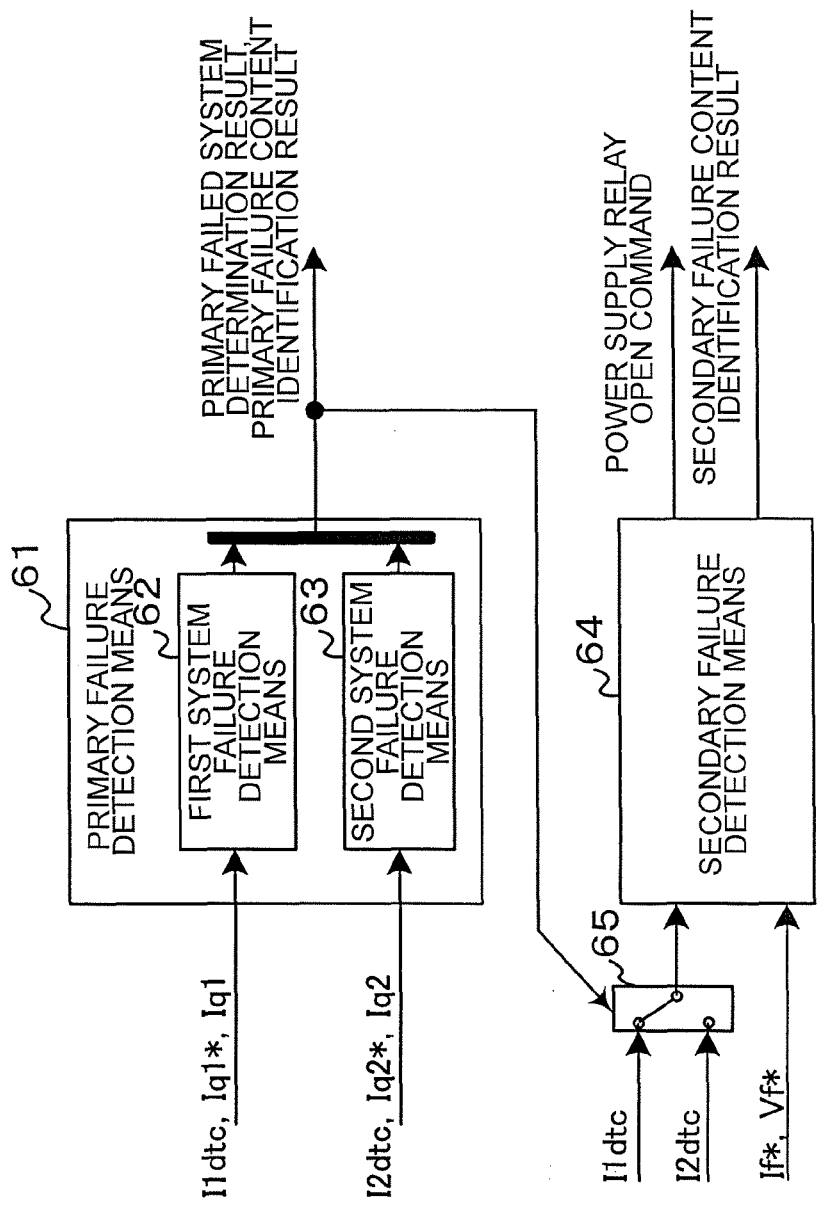
FIG. 3 is a configuration diagram of failure detection means according to the first embodiment of the present invention.

A description is now given of the failure detection means 33. FIG. 3 is a configuration diagram of the failure detection means 33 according to the first embodiment of the present invention. The failure detection means 33 illustrated in FIG. 3 is constituted by primary failure detection means 61, secondary failure detection means 64, and switching means 65.

The primary failure detection means 61 is means for detecting a failure occurring at first (primarily), namely a primary failure, and the secondary failure detection means 64 is means for detecting a failure occurring secondarily after the occurrence of the first failure, namely a secondary failure. A description is first given of the primary failure detection means 61.

The primary failure detection means 61 includes first system failure detection means 62 for detecting a failure in the first winding drive system and second system failure detection means 63 for detecting a failure in the second winding drive system. The first system failure detection means 62 and the second system failure detection means 63 have the same configuration, and a description is given only of the first system failure detection means 62.

The first system failure detection means 62 is constituted by open-circuit failure detection means for identifying a location of a failure in which one phase is in an open-circuit state, and short-circuit failure detection means for identifying a location of a short-circuit failure.

Though not illustrated, the open-circuit failure detection means and the short-circuit failure detection means may be publicly-known methods, and, as the open-circuit failure detection means, there is a method as described in Japanese Patent Application Laid-open No. 2007-244028. This method determines, when a power supply voltage and a motor rotation speed are respectively within predetermined ranges, a phase current is equal to or smaller than a predetermined value, and a phase voltage command is equal to or larger than a predetermined value, that this phase is in an open-circuit failure state.

Moreover, the short-circuit failure detection means may be constituted by, for example, abnormality detection means (27) and short-circuit location identification means (28) described in WO 2008/129658 A1. In this configuration, when the abnormality detection means determines that a certain abnormality occurs in an inverter or a motor, the short-circuit location identification means (28) identifies a location of the short-circuit failure.

The short-circuit location identification means (28) stores test patterns representing predetermined combinations for turning on switching elements of an inverter (25), and, based on average voltages of motor terminals, the stored test patterns, and a detected current in each of phases flowing in response to the test pattern, identifies a switching element failed by short-circuit, or a phase failed by a ground fault or a power-supply fault.

Moreover, the method disclosed in WO 2008/129658 A1 is used for a single winding drive system, but for a plurality of winding drive systems, the abnormality detection means may be carried out for each of the winding drive systems, and, for a winding drive system in which an abnormality is detected, the short circuit location identification means may be used to identify a short-circuit location.

In this way, when a failure occurs, the primary failure detection means 61 outputs a primary failed system determination result indicating whether the failure is in the first winding drive system or in the second winding drive system, and a primary failure content identification result indicating on which switching element a short-circuit failure occurs, in which phase a power-supply fault or a ground fault occurs, between which phases a short-circuit failure between phases occurs, or on which switching element or motor winding an open-circuit failure occurs.

A description is now given of an overview of an operation when a failure occurs.

It is assumed that a short-circuit failure or an open-circuit failure occurs in the first winding drive system. On this occasion, the first torque current required value Iq01* in the first winding drive system, which is on the failed side, is input via the switching means 38 to the failure-time current control means 30. Then, the failure-time current control means 30 calculates a failure-time phase voltage command Vf* as a phase voltage command V1* on the failed side, and provides, via the switching means 36, the first winding drive system on the failed side with the failure-time phase voltage command V1*.

As a result, the control suitable for the content of the failure is carried out, and generates, in the winding drive system on the failed side, a torque for restraining a torque pulsation and a brake torque which are caused by the failure, or a torque for quickly exiting, by acceleration, from a rotation angle range in which a brake torque is generated.

On the other hand, for the second winding drive system, which is the normal side, the second torque current required value Iq02* may be shaped by command shaping means, which is not shown, into a command for cancelling a brake torque component on the failed side, or into a torque current command for quickly exiting, by acceleration, from the rotation angle range in which a brake torque is generated. Then, the command shaped in this way is used as the second torque current command value Iq2*, which is an input to the second normal-time current control means 32.

The normal-time phase voltage command Vn2*, which is an output of the second normal-time current control means 32, is fed, as the phase voltage command V2*, via the switching means 37 to the second winding drive system on the normal side. In the second winding system on the normal side, the torque current precisely tracks the torque current command value in consideration of the effect of the failed first winding drive system.

A description is now specifically given of an operation in the first winding drive system when a short-circuit failure or an open-circuit failure occurs referring to the block diagram in above-mentioned FIG. 2. Based on the primary failed system determination result acquired by the primary failure detection means 61, the torque current required value Iq01* on the failed side is selected by the switching means 38, and is input, as a failed side torque current required value Iq0f*, into the failure-time current control means 30. Moreover, the phase current detection value I1dtc on the failed side is selected by the switching means 39, and is input, as a failed-side phase current detection value Ifdtc, into the failure-time current control means 30.

Further, the primary failure content identification result, which is acquired by the primary failure detection means 61, and the motor rotation angle signal θ are input to the failure-time current control means 30, and control suitable for the failure content is carried out. Note that, the operation of the failure-time current control means 30 is described later. Then, the failure-time phase voltage command Vf* calculated by the failure-time current control means 30 is selected by the switching means 36, and is output as the first phase voltage command V1*.

On the other hand, the second torque current required value Iq02* on the normal side is shaped into a torque current command suitable for the failure content, and is input, as the second torque current command value Iq2*, into the second normal-time current control means 32. Then, a second phase voltage command VP calculated by the second normal-time current control means 32 is selected by the switching means 37, and is output as the second phase voltage command V2*.

Figure 4:
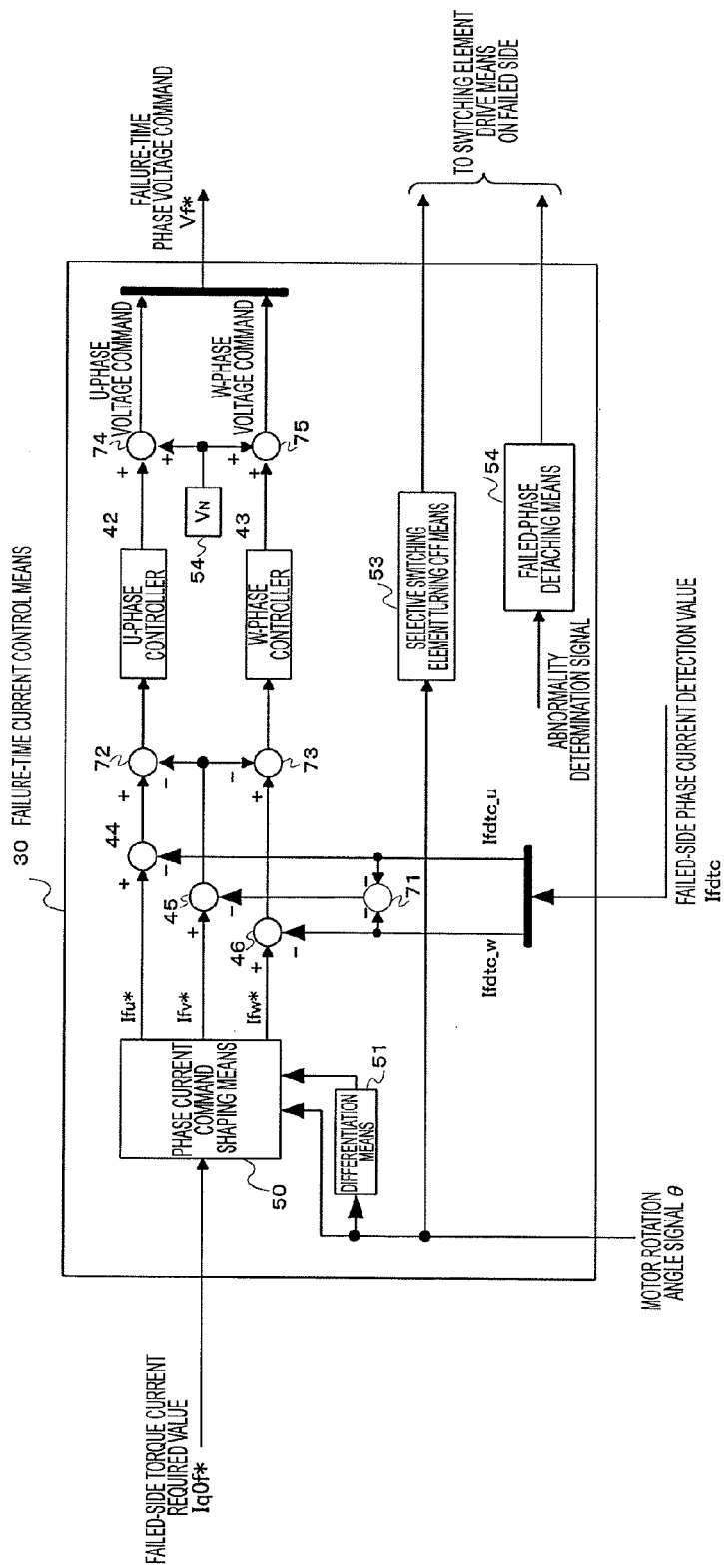
FIG. 4 is a configuration diagram of failure-time current control means according to the first embodiment of the present invention.

In the following, as a first case, by taking as an example a case where the switching element VN1 on the lower side in the V1 phase of the first winding drive system is failed by short circuit as a primary failure, a description is given of the operation of the failure-time current control means 30. FIG. 4 is a configuration diagram of the failure-time current control means 30 according to the first embodiment of the present invention. As the failure-time current control means 30, a method as illustrated in FIG. 3 of WO 2007/129359 A1 may be applied, and FIG. 4 according to the present invention illustrates a block diagram similar to this conventional technology.

An operation of the block diagram of FIG. 4 is the same as that of WO 2007/129359 A1, a detailed description thereof is thus omitted, and a control configuration suitable for the case where the switching element VN1 is failed by short circuit is provided. Phase current command shaping means 50 outputs failure-time phase current commands Ifu*, Ifv* and Ifw* based on the failed-side torque current required value Iq0f, the motor rotation angle signal θ, and a motor rotation angular velocity signal, which is a derivative of the motor rotation angle signal θ. Based on the commands, the failure-time phase current command Vf* is generated by a control component on a subsequent stage, which is not detailed.

Moreover, in a rotation angle range in which a positive torque cannot be generated, by selective switching element turning off means 53, all the switching elements on the inverter on the failed side are temporarily turned off, thereby restraining a brake torque generated by a current, which flows through a short-circuit path generated by an induced voltage. An operation of the phase current command shaping means 50 is described in WO 2007/129359 A1, and a detailed description thereof is therefore omitted.

A description is now given of a current and a torque which are generated by the first winding drive system on the failed side when the switching element VN1 in the first winding drive system is failed by short circuit as a primary failure. When the switching element VN1 is short-circuited, the V phase is short-circuited to the negative electric potential of the power supply. Accordingly, the phase current which can be generated is restricted, and the current in the V phase can be generated only in the negative direction. Thus, in a rotation angle range in which a current larger than currents in other phases originally needs to flow in the V phase, a positive torque cannot be generated.

Figure 5:
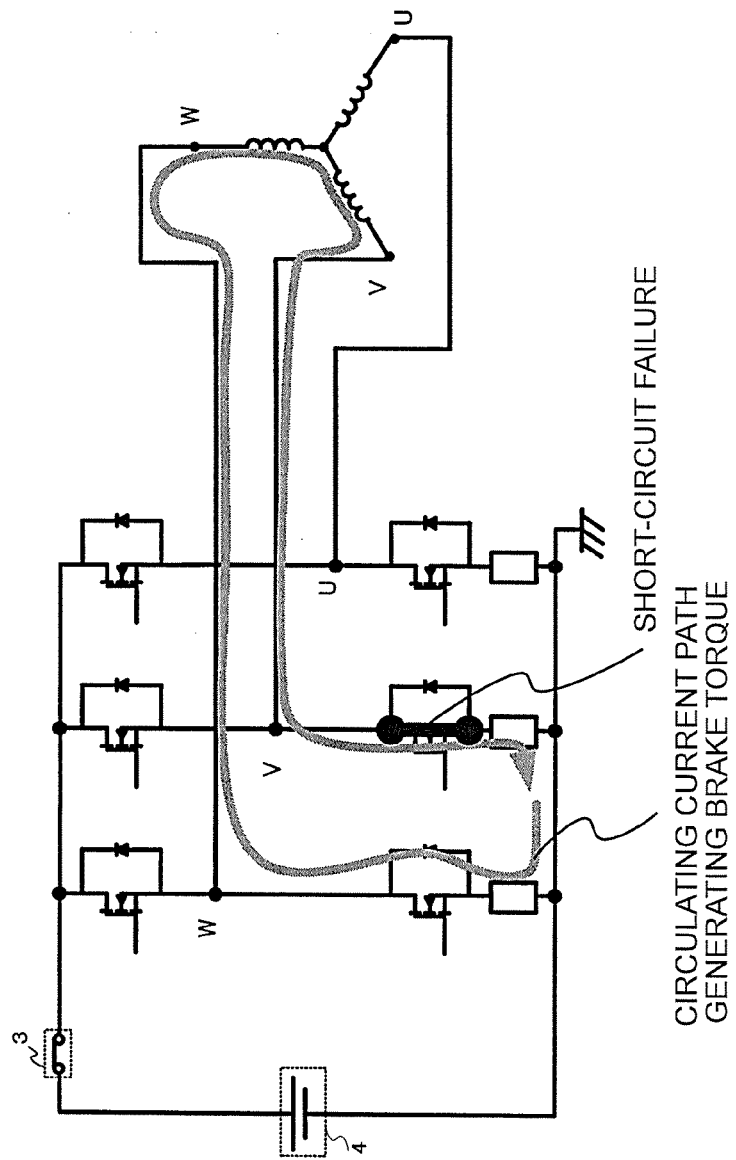
FIG. 5 is an explanatory diagram describing a cause of generation of a brake torque, according to the first embodiment of the present invention.

FIG. 5 in WO 2007/129359 A1 illustrates a waveform, which can be generated, and a unit phase current for realizing the torque waveform when it is required that a torque current be 1. As illustrated in FIG. 5(B) in WO 2007/129359 A1, the torque cannot be generated in the rotation angle from 0 degrees to 60 degrees. Conversely, when the motor is rotated by an external force, an induced voltage may generate a brake torque. In this rotation angle range, the selective switching element turning off means 53 temporarily turns off the switching elements, thereby reducing the current paths as many as possible, and reducing the brake torque.

A description is now given of a cause of generation of the brake torque. FIG. 5 is an explanatory diagram describing the cause of generation of the brake torque, according to the first embodiment of the present invention, and, more specifically, is a diagram illustrating a path of a circulating current that is caused to flow by an induced voltage when the lower switching element in the V phase fails by short circuit. When the switching element VN1 is failed by short circuit, even if a command of turning off is provided for all the switching elements, a diode generally arranged in parallel with the switching element is brought into the ON state when the lower switching element in the V phase fails by short circuit. As a result, as illustrated in FIG. 5, a current circulating through the location in which a short-circuit failure has occurred, the diode, and the winding is generated.

As illustrated in FIG. 5, this current does not flow through the power supply, and hence cannot be prevented even by opening the power supply relay 3. The circulating current generated by the induced voltage generates the brake torque on the motor 5. Moreover, also in a ground-fault failure or a power-supply-fault failure of a motor line, a circulating current is similarly generated.

In the primary failure, the number of short-circuit failure locations is one, and the above-mentioned failure-time current control can prevent a state in which an excessive current flows out from the power supply, and hence the control can be continued while the power supply relay 3 is in the connected state.

In this way, even if a short-circuit failure occurs in the winding drive system as the primary failure, the failure-time current control means 30 can restrain the brake torque from being generated by the current in the short-circuit failure path on the failed side as much as possible, and, by adding the torque on the normal side, a sufficient torque close to that in the normal time can be realized.

In the following, as a second case, by taking as an example a case where the switching element or the motor line in the U1 phase of the first winding drive system is failed by open circuit as a primary failure, a description is given of the operation of the failure-time current control means 30. In this case, the failure-time current control means 30 may use a method illustrated in FIG. 3 of WO 2005/091488 A1. No detailed description is given of the operation of a block diagram of FIG. 3 of WO 2005/091488 A1 but a control configuration suitable for a case where the U phase is failed by open circuit is provided.

With this configuration, even if an open-circuit failure occurs as a primary failure in a winding drive system, control for compensating a lack of torque at a motor rotation angle at which the torque generated in the failure by open circuit becomes zero can be provided, and, by adding the torque on the normal side, a sufficient torque close to that in the normal time can be realized.

As described above, in the failure-time current control means 30, the control for the short-circuit failure and the control for the open-circuit failure are provided, and, based on the primary failure content identification result, the failure-time current control means 30 is configured to switch the control to be used.

A specific description is now given of an operation and a related configuration for a case where, after a primary failure occurs, a secondary failure occurs on the failed side while the failure-time current control means 30 continues the control on the failed side.

As illustrated in FIG. 3, based on the primary failed system determination result by the primary failure detection means 61, in the switching means 65, the phase current detection value I1*dtc* or I2*dtc* of the system on the failed side is selected, and is input to the secondary failure detection means 64. The secondary failure detection means 64 selects and carries out a method of detecting a secondary failure, based on the primary failure content identification result.

In the following, by taking as an example a case where the switching element VN1 on the lower side in the V1 phase of the first winding drive system is failed by short circuit as a primary failure (corresponding to the above-mentioned first case), a description is given of the secondary failure detection and an action to be taken after the detection.

The secondary failure detection means 64 includes phase current excess detection means, phase current command excess detection means, and secondary open-circuit failure detection means, and, after a primary failure is detected, these detection means are activated and are executed.

Figure 6:
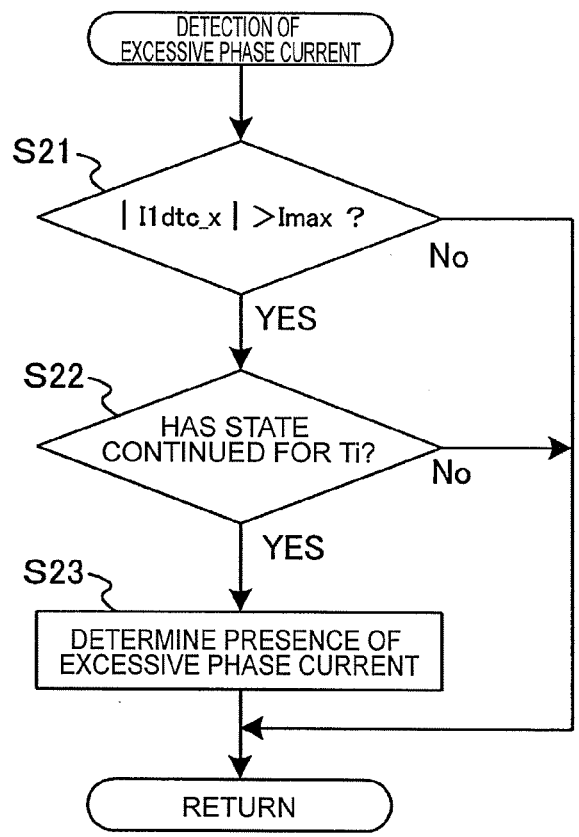
FIG. 6 is a flowchart illustrating a sequence of operation relating to phase current excess detection means in secondary failure detection means according to the first embodiment of the present invention.

First, a description is given of an operation of the phase current excess detection means. FIG. 6 is a flowchart illustrating a sequence of operation relating to the phase current excess detection means in the secondary failure detection means 64 according to the first embodiment of the present invention.

In Step S21, the phase current excess detection means determines whether or not the magnitude of the phase current detection value in each of the phases is larger than a predetermined maximum current value Imax. Then, when the phase current excess detection means determines that there is a state in which the magnitude of the phase current detection value is larger than the predetermined maximum current value Imax, in Step S22, the phase current excess detection means determines whether or not the state has continued for a period equal to or longer than a predetermined determination period Ti.

When the phase current excess detection means determines that the state has continued for the above-mentioned period, the phase current excess detection means determines, in Step S23, that, in the phase in which the determination condition is established in the previous step S21, an abnormal state of an excessive phase current has occurred, and determines the presence of the phase current excess. On the other hand, when the determination in the previous step S21 or S22 is negative (corresponding to "NO" in Steps S21 or S22 of FIG. 6), the phase current excess detection means does not determine the presence of the phase current excess, and the processing by the phase current excess detection means is repeated again.

On this occasion, I1$dtc\_x$ in Step S21 means x takes any one of U1, V1, and W1, and represents any one of the phase current detection value in the respective phases, Iu1$dtc$, Iv1$dtc$, and Iw1$dtc$. Moreover, in order to detect a failure in the second winding drive system, the same failure detection is carried out for the respective phases U2, V2, and W2.

As described above, the configuration of detecting a secondary failure based on whether or not the magnitude of the current detection value of each of the phases is larger than the predetermined maximum current value is provided, and hence it is possible to detect in which phase a secondary failure has occurred and the abnormality of the excessive phase current has been generated.

Figure 7:
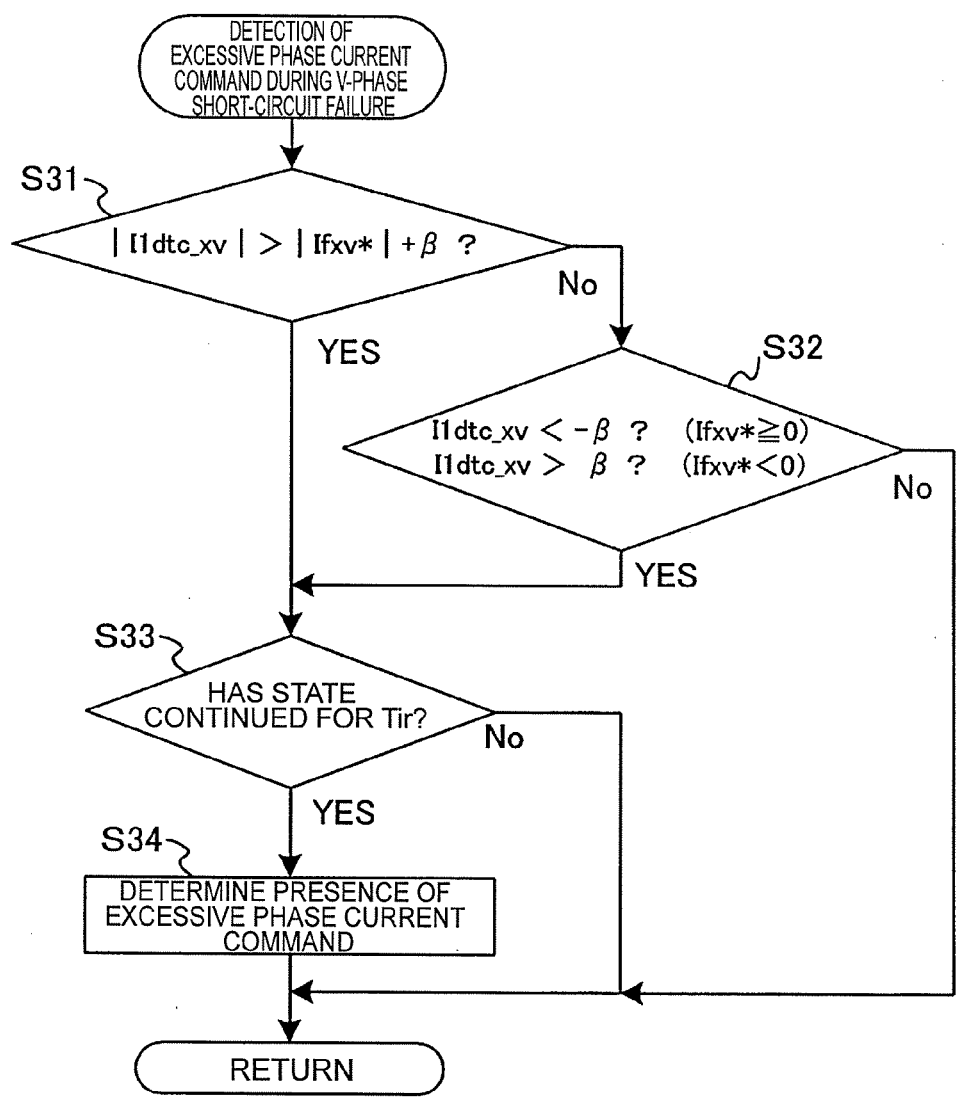
FIG. 7 is a flowchart illustrating a sequence of operation relating to phase current command excess detection means in the secondary failure detection means according to the first embodiment of the present invention.

A description is now given of the operation of the phase current command excess detection means. FIG. 7 is a flowchart illustrating a sequence of operation relating to the phase current command excess detection means in the secondary failure detection means 64 according to the first embodiment of the present invention.

In Step S31, the phase current command excess detection means determines whether or not a magnitude |I1$dtc\_xv$| of a detection value of a current flowing between a failed phase and a normal phase is larger than a value of a sum of a magnitude |Ifxv*| of a target value thereof and a predetermined error current value β. Then, when the phase current command excess detection means determines that the magnitude is larger than the value of the sum (corresponding to "YES" in Step S31 of FIG. 7), the phase current command excess detection means proceeds to Step S33, and when the phase current command excess detection means determines that the magnitude is not larger than the sum (corresponding to "NO" in Step S31 of FIG. 7), the phase current command excess detection means proceeds to Step S32.

In Step S32, the phase current command excess determination means determines whether the detection value I1$dtc\_xv$ of the current flowing between a failed phase and a normal phase is, in a direction opposite to the target value Ifxv* thereof, the predetermined error current value β. When the phase current command excess determination means determines that the current detection value I1$dtc\_xv$ is the predetermined error current value β in the opposite direction (corresponding to "YES" in Step S32 of FIG. 7), the phase current command excess determination means proceeds to Step S33.

Then, in Step S33, the phase current command excess detection means determines whether or not the determination condition in the previous step S31 or S32 has been established for a period equal to or longer than a predetermined determination period Tir. When the phase current command excess detection means determines that the determination condition has been established for the period equal to or longer than the predetermined determination period Tir (corresponding to "YES" in Step S33 of FIG. 7), the phase current command excess detection means determines, in Step S34, that the abnormality that the magnitude of the phase current exceeds the magnitude of the command, or the abnormality that the phase current is in the direction opposite to the command has occurred, and determines the presence of the phase current command excess.

On the other hand, when the determination in the previous step S32 or Step S33 is negative (corresponding to "NO" in Steps S32 and S33 of FIG. 3), the phase current command excess detection means does not determine the presence of the phase current excess, and the processing by the phase current command excess detection means is repeated again.

On this occasion, I1$dtc\_xv$ in Step S31 means the difference between the phase current detection value I1$dtc\_x$ in an x phase and the phase current detection value I1$dtc\_v$ in the phase V1 in which a primary failure has occurred, namely (I1$dtc\_x$-I1$dtc\_v$). Moreover, Ifxv* in Steps S31 and S32 means the difference between the phase current command Ifx* in the x phase and the phase current command Ifv* in the V1 phase in which a primary failure has occurred, namely (Ifx*-Ifv*). Moreover, symbol x represents any one of U1 and W1 other than the phase in which a primary failure has occurred.

On this occasion, the failure-time current control means 30 of FIG. 4 of the subject application described as the conventional technology is configured, when a short-circuit failure occurs, to carry out control by controllers 42 and 43 based on the difference in state quantity between a phase in which a primary failure is generated and the other phases as subtractors 72 and 73 provide. Thus, in the phase current command excess detection means in the secondary failure detection means 64 according to the present invention, by referring to the processing by the failure-time current control means 30, the method is improved to the secondary failure detection method suitable for a failed state based on the differences.

In this way, by configuring the failure detection method based on an existing primary failure state or the failure-time control means, a secondary failure can be precisely detected. Moreover, by determining the sign and the magnitude of the current command value and the current detection value of each of the phases, a secondary failure can be precisely detected, and, further, by determining, based on the differences in the current command value and the current detection value between the phases, the sign and the magnitude, the secondary failure can be more precisely detected.

Figure 8:
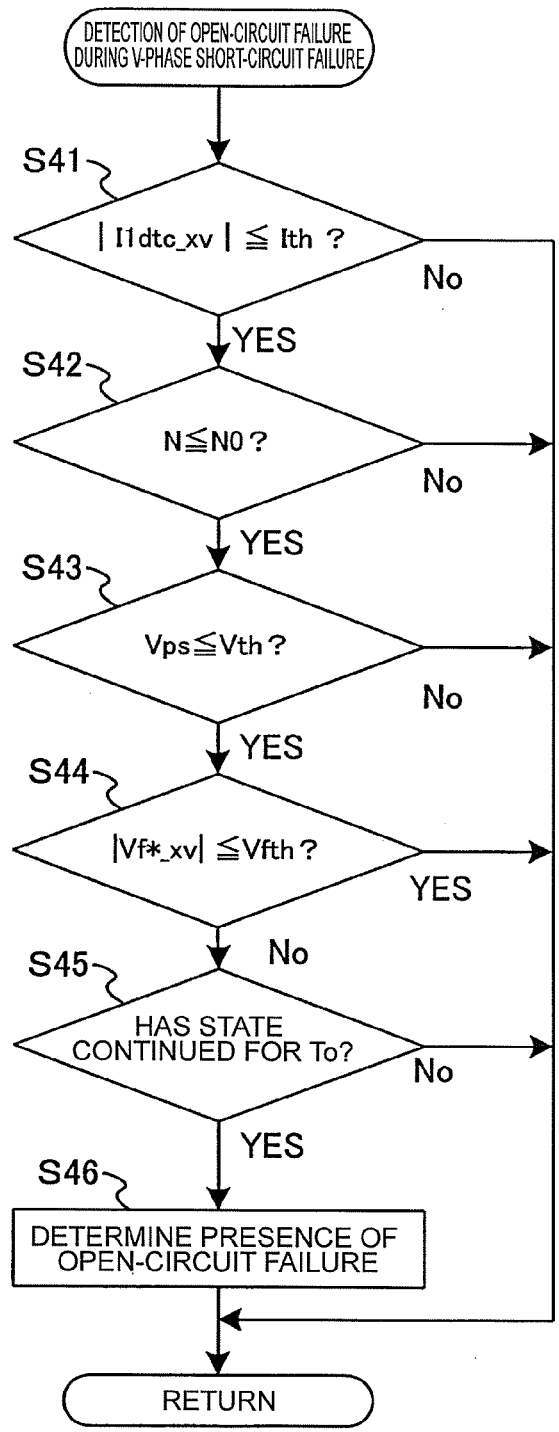
FIG. 8 is a flowchart illustrating a sequence of operation relating to secondary open-circuit failure detection means in the secondary failure detection means according to the first embodiment of the present invention.

A description is now given of the operation of the secondary open-circuit failure detection means. FIG. 8 is a flowchart illustrating a sequence of operation relating to the secondary open-circuit failure detection means in the secondary failure detection means 64 according to the first embodiment of the present invention. The secondary open-circuit failure detection means is basically the same as a method disclosed in Japanese Patent Application Laid-open No. 2007-244028, but the secondary open-circuit failure detection means is, as in the phase current excess detection means, different from the method in that the currents and the voltage commands to be used for determination are replaced by the difference in state quantity between a phase in which the primary failure has occurred and the other phases.

In Step S41, the secondary open-circuit failure detection means determines whether or not a magnitude $|I1dtc\_xv|$ of the detection value of the current flowing between a failed phase and a normal phase is equal to or smaller than a predetermined current value Ith, and when the secondary open-circuit failure detection means determines that the magnitude is equal to or smaller than the predetermined current value Ith, the secondary open-circuit failure detection means proceeds to Step S42.

Then, in Step S42, the secondary open-circuit failure detection means determines whether or not a motor rotation speed N is equal to or smaller than a predetermined rotation speed N0, and when the secondary open-circuit failure detection means determines that the motor rotation speed N is equal to or smaller than the predetermined rotation speed N0, the secondary open-circuit failure detection means proceeds to Step S43.

Then, in Step S43, the secondary open-circuit failure detection means determines whether or not a voltage Vps of the power supply is equal to or smaller than a predetermined power supply voltage value Vth, and when the secondary open-circuit failure detection means determines that the voltage Vps is equal to or smaller than the predetermined power supply voltage value Vth, the secondary open-circuit failure detection means proceeds to Step S44.

In Step S44, the secondary open-circuit failure detection means determines whether or not a magnitude $|Vf^*\_xv|$ of the voltage command of the voltage applied between a failed phase and a normal phase is equal to or smaller than a predetermined voltage command value Vfth, and when the secondary open-circuit failure detection means determines that the magnitude is not equal to or smaller than the predetermined voltage command value Vfth, the secondary open-circuit failure detection means proceeds to Step S45.

Then, in Step S45, the secondary open-circuit failure detection means determines whether or not the state in which the determination condition is not established (NO) in the previous step S44 has continued for a period equal to or longer than a determination period To, and when the secondary open-circuit failure detection means determines that the negative determination state has continued for the period equal to or longer than the determination period To, the secondary open-circuit failure detection means proceeds to Step S46, determines that the phase is in the state of the open-circuit failure, and determines the presence of the secondary open-circuit failure.

On the other hand, when the determination is negative in Step S41, S42, S43, or S45, (namely, NO in each of the steps), and when the determination in Step S44 is affirmative (namely, YES in Step S44), the presence of the secondary open-circuit failure is not determined, and, the processing by the secondary open-circuit failure detection means is repeated again.

On this occasion, $Vf^*\_xv$ in Step S44 represents a difference between the phase voltage command value $Vf^*\_x$ in the x phase and the voltage value $Vf\_v$ in the failed phase V1, namely $(Vf^*\_x - Vf\_v)$. Currently, the lower switching element VN1 in the V1 phase is failed by short circuit, and hence the voltage value in the failed phase V1 sticks to the negative electric potential of the power supply, and, when the voltage value $Vf\_v$ is represented by the voltage with respect to the neutral point in the scale of the voltage command, the voltage value $Vf\_v$ is a negative value VN, which is the half of the power supply voltage Vps, namely $-Vps/2$.

With this configuration, the secondary open-circuit failure detection means determines, when the primary failure is a short-circuit failure, whether or not, based on the difference in the state quantity between the failed phase and the normal phase, the current response matches the voltage command, and, when the responding current is small though the voltage command is applied to the failed phase and the normal phase, the secondary open-circuit failure detection means determines that an abnormality is caused by a non-conduction of the current, and can identify the presence of the secondary open-circuit failure.

In this way, by configuring the failure detection method based on an existing primary failure state or based on a control method for the existing primary failure state, the secondary failure detection means 64 can precisely detect a secondary failure.

Moreover, by determining the sign and the magnitude of the voltage command value and the current detection value of each of the phases, a secondary failure can be precisely detected, and, further, by determining, based on the differences in the voltage command value and the current detection value between the phases, the sign and the magnitude, the secondary failure can be more precisely detected.

In this way, the secondary failure detection means 64 is configured to determine, based on the current in each of the phases and the command value thereof, or the command value for the voltage of each of the phases, a failed state, and can thus precisely detect the secondary failure. Moreover, the secondary failure detection means 64 is configured to determine, based on the difference in current between the phases and the difference in command value between the phases, or the difference in the command value for the voltage between the phases, a failed state, and can thus detect a failure based on an existing primary failure state or a control method for the failure state, and can more precisely detect the failure.

Figure 9:
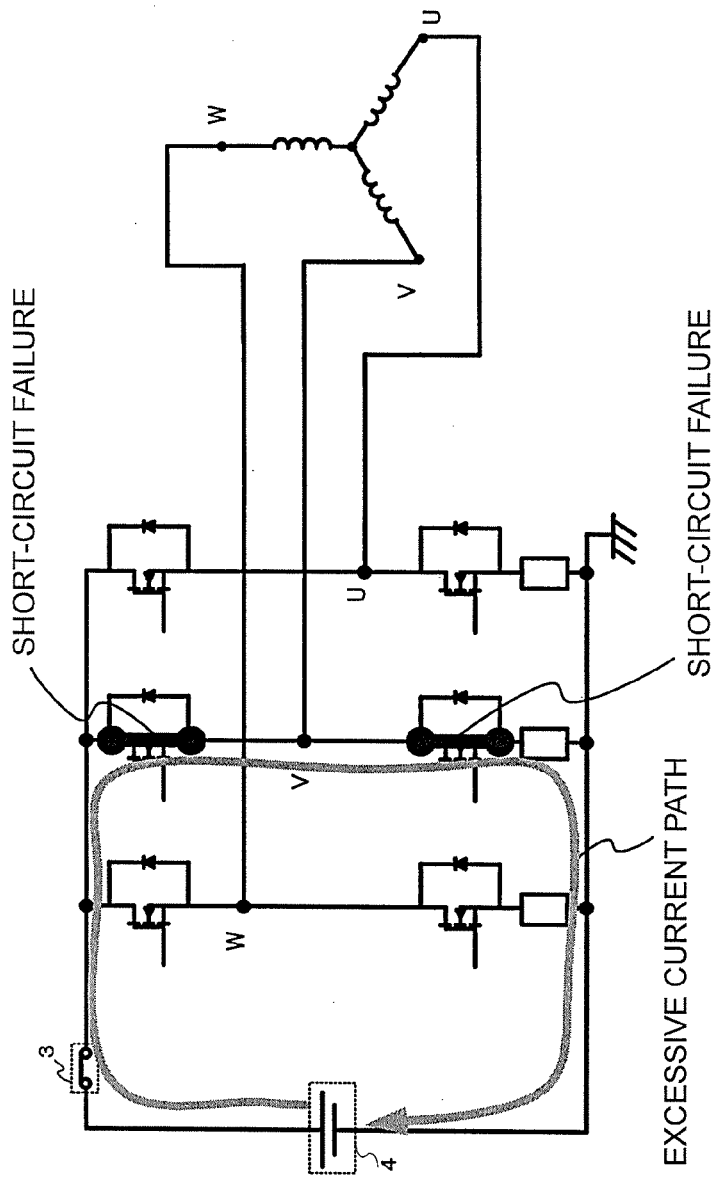
FIG. 9 is an explanatory diagram illustrating a state of a current in a case where a primary failure is a short-circuit failure of a switching element on a lower side in a V phase, and a secondary failure is a short-circuit failure of a switching element on an opposite side (upper side) in the same phase, according to the first embodiment of the present invention.
Figure 10:
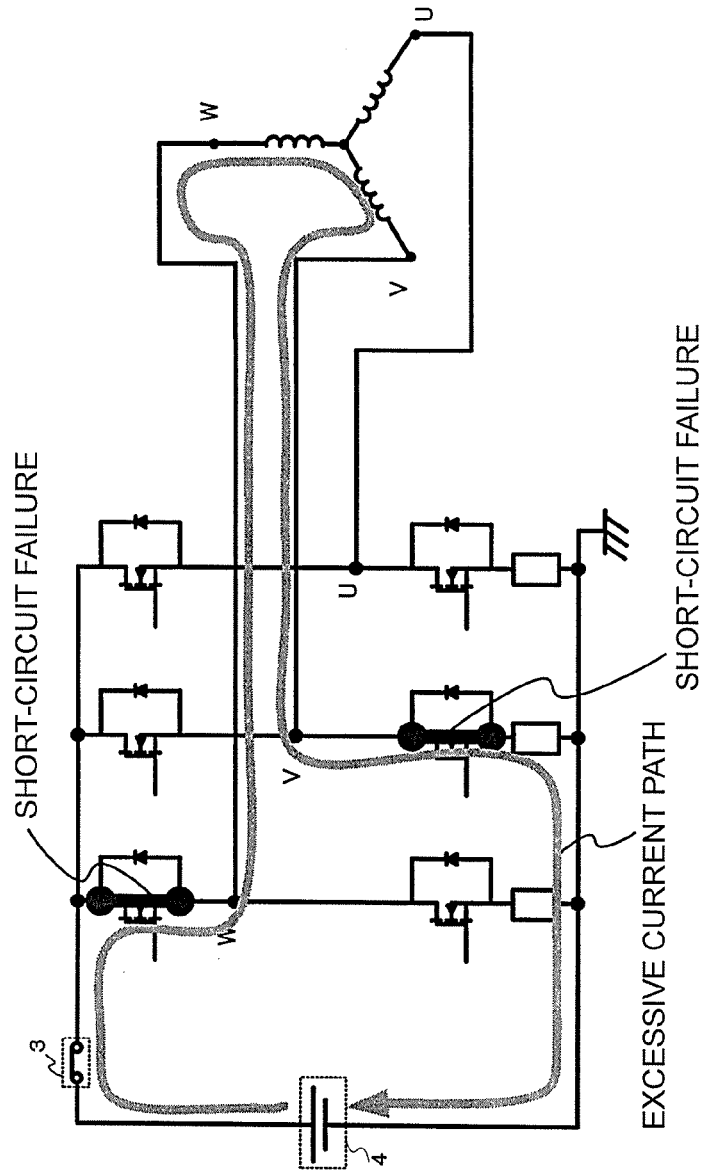
FIG. 10 is an explanatory diagram illustrating a state of a current in a case where a primary failure is a short-circuit failure of the switching element on a lower side in a V phase, and a secondary failure is a short-circuit failure of a switching element on the opposite side (upper side) in another phase (U phase in this case), according to the first embodiment of the present invention.

A description is now given of a state of the current in a case where as the primary failure, a short-circuit failure has occurred in a winding drive system, and, then, a short-circuit failure occurs in a winding drive system in the same system by taking two cases of FIGS. 9 and 10 as examples.

FIG. 9 is an explanatory diagram illustrating a state of a current in a case where a primary failure is a short-circuit failure of the switching element on the lower side in the V phase, and a secondary failure is a short-circuit failure of the switching element on the opposite side (upper side) in the same phase, according to the first embodiment of the present invention. Note that, the sequence of the primary failure and the secondary failure may be reversed. In this case, via the two locations of the short-circuit failure, the positive electrode and the negative electrode of the power supply are substantially in the short-circuit state, and an excessive current flows out from the power supply. As a result, excessive heat generation and current consumption occur.

Note that, in place of the short circuit of the switching element, even when failures (ground fault and power-supply fault) that the inverter output and the connection wire of the motor line in the same phase are short-circuited to the positive electric potential and the negative electric potential of the power supply occur, as long as two locations are respectively short-circuited to the positive electrode side and the negative electrode side in the same phase, a similar excessive current flows.

FIG. 10 is an explanatory diagram illustrating a state of a current in a case where a primary failure is a short-circuit failure of the switching element on the lower side in the V phase, and a secondary failure is a short-circuit failure of the switching element on the opposite side (upper side) in another phase (U phase in this case), according to the first embodiment of the present invention. The sequence of the primary failure and the secondary failure may be reversed. In this case, via the two locations of the short-circuit failure and the motor windings, a closed circuit including the negative electric potential and the positive electric potential of the power supply is formed, and an excessive current flows out from the power supply. As a result, excessive heat generation and current consumption occur.

Compared with the case of FIG. 9, in the case of FIG. 10, a voltage drops by an amount corresponding to the route via the windings and the current thus decreases, but the power supply is still in the closed circuit, and the current is excessive. Note that, in place of the short circuit of the switching element, even when failures (ground fault and power-supply fault) that the inverter output and the connection wire of the motor line are short-circuited to the positive electric potential and the positive electric potential of the power supply occur, a similar excessive current flows.

The excessive current states illustrated in FIGS. 9 and 10 are detected by the phase current excess detection means and the phase current command excess detection means of the secondary failure detection means 64. When any one of the phase current excess detection means and the phase current command excess detection means determines a failure, the secondary failure detection means 64 determines that an excessive current possibly flows from the power supply, and outputs a power supply relay open command, thereby opening the power supply relay 3. As a result, the electric connection between the power supply and the inverter can be disconnected at once, thereby preventing an excessive current from flowing from the power supply.

On the other hand, as a secondary failure, when the secondary open-circuit failure detection means detects an open-circuit failure, an excessive current as described before does not possibly occur, it is not necessary to open the power supply relay 3, and the control on the normal side may continue.

In the following, as a primary failure, by taking a case where the switching element in the U1 phase of the first winding drive system or the motor line is failed by open circuit (corresponding to the above-mentioned second case) as an example, a description is given of the secondary failure detection, and response after the detection.

The secondary failure detection means 64 includes the phase current excess detection means, the phase current command excess detection means, and the secondary open-circuit failure detection means, and, after a primary failure is detected, those detection means are activated and are executed.

The phase current excess detection means may be configured to carry out the same operation as in FIG. 6 used to describe the first case. Moreover, the phase current command excess detection means may be configured, when a primary failure is an open-circuit failure, without acquiring the difference between the failed phase and each of the normal phases, to make determination, for each of the phases, based on a comparison with the command, and a detailed description thereof is therefore omitted.

The secondary open-circuit failure detection means may be, as in the method carried out in the primary failure detection, the method of Japanese Patent Application Laid-open No. 2007-244028. This is because, unlike in a short-circuit failure, the voltage applied to the winding in each of the normal phases can be controlled for each of the phases by the inverter, and the same method as in the normal time can be taken over.

With this configuration, the secondary failure detection means 64 can detect, when, as a primary failure, one phase of the first winding drive system is failed by open circuit, and, then, in the same winding drive system, a secondary failure occurs, the secondary failure. When the secondary failure is detected, the control on the failed side is further restricted, or is stopped, and the control for the winding drive system on the normal side is continued.

This is because the number of the short-circuit failure on the failed side is as many as one location, a closed circuit containing the power supply is not formed by the failure location, an excessive current does not possibly flow, it is not necessary to open the power supply relay 3, and the control can be continued.

Figure 11:
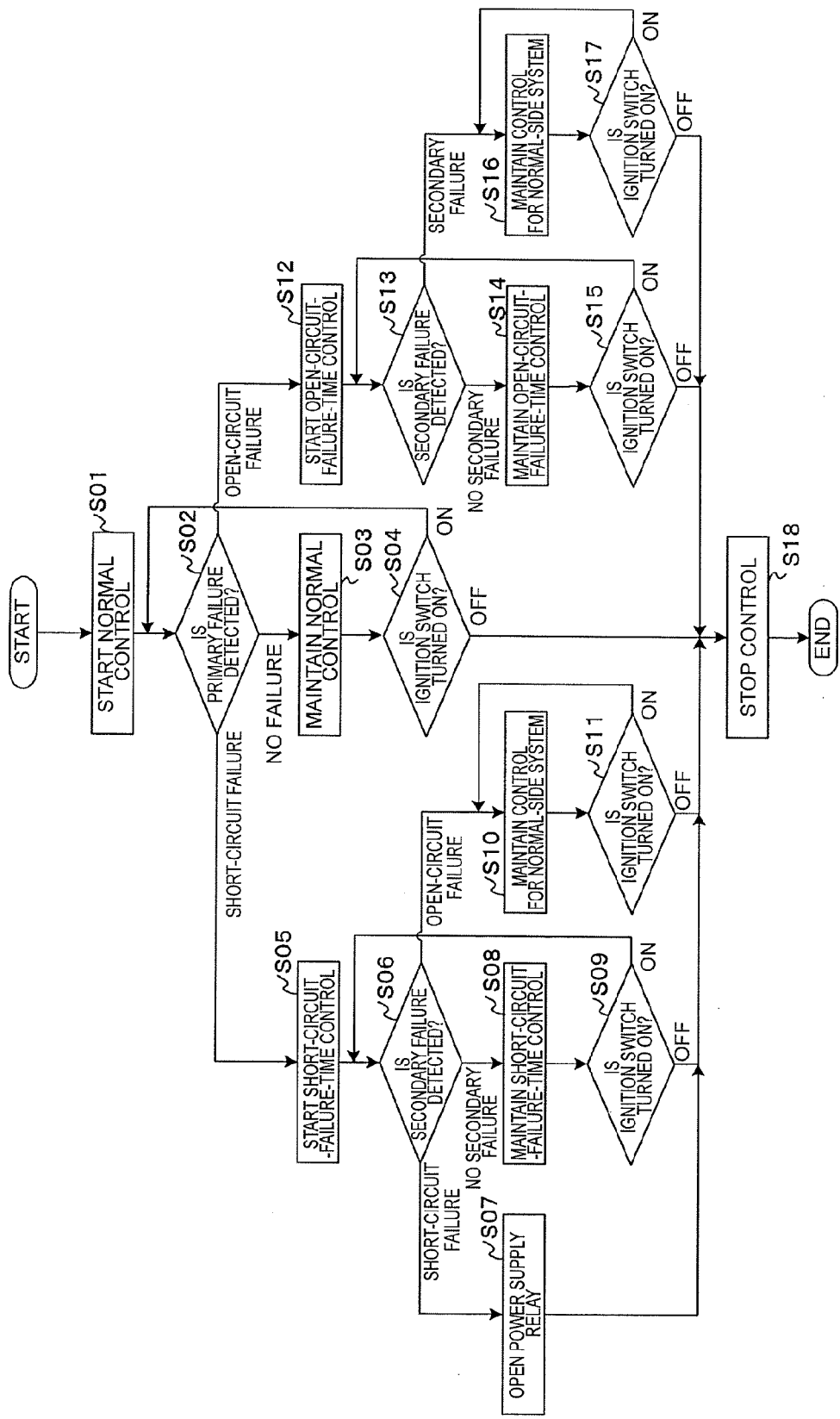
FIG. 11 is a flowchart illustrating a sequence of processing by the current control means according to the first embodiment of the present invention.

A description is now given of an overall operation by the current control means 23 relating to the primary failure detection and the secondary failure detection realized by the above-mentioned configuration referring to a flowchart. FIG. 11 is a flowchart illustrating a sequence of processing by the current control means 23 according to the first embodiment of the present invention.

First, in Step S01, the current control means 23 starts normal control, and, in Step S02, depending on a detected content of a primary failure, branches the control processing. Then, when a failure is not detected in Step S02, in Step S03, the current control means 23 continues normal control, and, in Step S04, when an ignition switch, which serves as a start command for the motor control device, is turned on, the current control means returns to Step S02.

Moreover, in the primary failure detection in the previous step S02, when a short-circuit failure (the failure includes a ground-fault failure and a power-supply-fault failure, but in the following, a description is given of the short-circuit failure) is detected, the current control means 23, in Step S05, starts, by the failure-time current control means 30, the failure-time current control (namely, short-circuit-failure-time control) suitable for the short-circuit failure. Then, in Step S06, the current control means 23 carries out the secondary failure detection during the short-circuit failure, which is the primary failure, and, when the current control means 23 detects a short-circuit failure as a secondary failure, in Step S07, the current control means 23 sets, by the power supply relay open command, the power supply relay 3 to the open state, and, in Step S18, stops the control.

Moreover, in the secondary failure detection in Step S06, when a secondary failure is not detected during the short-circuit failure, which is the primary failure, in Step S08, the current control means 23 maintains the short-circuit-failure-time control, and, in Step S09, when the ignition switch is turned on, the current control means 23 returns to Step S06.

Moreover, in the secondary failure detection in Step S06, when an open-circuit failure is detected during the short-circuit failure, which is the primary failure, in Step S10, the current control means 23 continues the control for the system on the normal side. The system on the failed side may be configured so that the control is stopped, or further limited control is continued. Then, in Step S11, when the ignition switch is turned on, the current control means 23 returns to Step S10.

Moreover, in the primary failure detection in the previous step S02, when the current control means 23 detects an open-circuit failure, the current control means 23 starts, in Step S12, by the failure-time current control means 30, failure-time current control (open-circuit-failure-time control) suitable for the open-circuit failure. Then, in Step S13, the current control means 23 carries out the secondary failure detection during the open-circuit failure, which is the primary failure, and when a secondary failure is not detected, the current control means 23 maintains the open-circuit-failure-time control in Step S14, and, in Step S15, when the ignition switch is turned on, the current control means 23 returns to Step S13.

On the other hand, in the secondary failure detection in Step S13, when a secondary failure is detected, the current control means 23 continues the control for the system on the normal side in Step S16. The system on the failed side may be configured so that the control is stopped, or further limited control is continued. Then, in Step S17, when the ignition switch is turned on, the current control means 23 returns to Step S16.

When the ignition switch is turned off in any one of Steps S09, S11, S15, and S17, in Step S18, the current control means 23 stops the control.

A description is now given of effects brought about by the motor control device according to the first embodiment described above.

A control device for controlling a motor provided with a plurality of sets of windings may be configured so that, when, as a primary failure, a short-circuit failure, a ground-fault failure, or a power-supply-fault failure in an inverter or a part of windings is detected, control for an inverter on the normal side is continued, and, further, if the secondary failure detection means detects a secondary failure in a winding or the inverter on the side of the primary failure, the power supply relay is opened.

As a result, an excessive current which can occur when a secondary failure occurs is prevented by opening the power supply relay, thereby preventing excessive heat generation and current consumption. Further, in order to prevent an excessive current by a secondary failure during a primary failure, a measure of disconnecting an electric connection to the power supply only on the failed side, which is required in the conventional case, is no longer necessary. As a result, the power supply relays can be one common to the respective winding drive systems, and hence it is possible to obtain a remarkable effect that the cost can be reduced, which is not provided by the conventional case.

Moreover, there may be provided a configuration in which failure-time current control means for generating a failure-time voltage command based on a content of a failure detected by the primary failure detection means is provided, and when the primary failure detection means detects a short-circuit failure of a switching element, or a failure by ground fault or power-supply fault of the inverter or the winding, the control of the inverter on the failure side is continued by the failure-time voltage command.

As a result, when a primary failure occurs, the power supply relay is not opened, and the control for the winding drive system on the failed side is continued, thereby generating a torque as close to that in the normal time as possible even on the failed side. Consequently, a brake torque generated during the failure can be reduced as much as possible, and an effect of providing a sufficient output torque close to that in the normal time is provided.

Moreover, the secondary failure detection means determines whether a secondary failure is a short-circuit failure in a winding or an inverter, or an open-circuit failure, and there may be provided a configuration in which, when a result of the determination by the secondary failure detection means is an open-circuit failure, after the occurrence of the secondary failure, even the control for the inverter on the normal side can be continued.

As a result, it is possible to obtain an effect that because whether or not an excessive current is caused to flow by the secondary failure can be determined, and when it is determined that an open-circuit failure is present, an excessive current does not flow, even after the occurrence of the secondary failure, the control for the winding drive system on the normal side can be continued, thereby causing the torque output to be as close to that in the normal time as possible, and preventing excessive heat generation and current consumption.

Moreover, there may be provided a configuration in which when the primary failure detection means detects an open-circuit failure of the winding or the inverter, and, further, and the secondary failure detection means detects a failure of the winding or the inverter on the failed side, even after the secondary failure occurs, the control for the inverter on the normal side can be continued.

As a result, when the primary failure is open-circuit failure, and a secondary failure is subsequently detected, the number of locations of the short-circuit failure is one, and it can be determined that an excessive current does not flow. Therefore, it is possible to obtain the effect that, after the secondary failure occurs, the control for the winding drive system on the normal side can be continued, thereby causing the torque output to be as close to that in the normal time as possible, and also preventing excessive heat generation and current consumption.

Moreover, the above-mentioned motor control device and the motor of the plurality of sets of windings can be applied to an electric motor control apparatus and a motor for an electric power steering device as described in WO 2007/129359. As a result, an excessive current which can occur when a secondary failure occurs is prevented by opening the power supply relay, thereby preventing excessive heat generation and current consumption.

Further, as in the conventional case, in order to prevent an excessive current by a secondary failure during a primary failure, a measure of disconnecting an electric connection to a power supply only on the failed side is no longer necessary. As a result, the power supply relays can be one common to the respective winding drive systems, and hence it is possible to obtain a remarkable effect that the cost can be reduced, which is not provided by the conventional case.

Moreover, when a failure occurs, by restraining the brake torque to a minimum value, a torque pulsation can be restrained, and, also, on the normal side, the control can be continued. As a result, a sufficient output torque can be obtained, a torque close to that in the normal time can be realized, and hence it is possible to obtain an effect that a sense of discomfort felt by a driver during the failure can be sufficiently reduced.

Moreover, in the configuration of this embodiment, without providing a relay between the inverter and the windings, while the brake torque is being restrained, the failure-time current control can be provided. As a result, the cost for the motor relays can be reduced, and an effect of the low cost can also be provided.

Note that, in the above-mentioned embodiment, the windings are configured as the star connection, but the windings may be configured as the delta connection, and, as a control method, by processing of offsetting a motor rotation angle used for the command generation, thereby shifting the phase of the command value, the same control effect can be acquired. Further, regarding the failure detection, a difference is only the phase shift and the like, and, thus, without specifically changing the method, the method can be taken over, thereby acquiring the same effect.

Moreover, in the above-mentioned embodiment, the secondary failure detection means detects a secondary failure in a winding drive system on the side on which a primary failure has occurred. However, the present invention is not limited to this case. For example, the failure detection in a winding drive system on a normal side on which a primary failure has not occurred may be carried out by the first system failure detection means 62 or the second system failure detection means 63, which is the normal side, in the primary failure detection means 61, and, depending on a failure content detected by the first system failure detection means 62 or the second system failure detection means 63, the failure-time current control may be carried out, or the power supply relay may be opened.

What is claimed is:

1. A motor control device for supplying from a power supply and controlling a current to flow through a motor provided with a plurality of sets of windings, comprising:
   a plurality of inverters comprising a switching element in each of phases of the plurality of sets of windings for controlling a voltage applied to the each of the phases, thereby controlling a current to be supplied from the power supply to the each of the phases of the plurality of sets of windings;
   a power supply relay provided between the power supply and the plurality of inverters for disconnecting an electrical connection; and
   current control means for providing, depending on a target value of a torque to be generated by the motor, each of the plurality of inverters with a voltage command corresponding to the voltage, thereby controlling the current to flow through the plurality of sets of windings, wherein:
   the current control means comprises:
      primary failure detection means for detecting the primary failure of any one of the plurality of sets of windings and the plurality of inverters; and
      secondary failure detection means for detecting, after a primary failure is detected, a secondary failure occurring in any one of a winding and an inverter in a system in which the primary failure has occurred; and
   the current control means is configured to:
      when the primary failure detection means detects, in any one of the plurality of inverters and a part of the plurality of sets of windings, any one of a short-circuit failure, a ground-fault failure, and a power-supply-fault failure as the primary failure, continue control for an inverter on a normal side; and
      further, when the secondary failure detection means detects the secondary failure, open the power supply relay.

2. A motor control device according to claim 1, wherein the power supply relay comprises a single power supply relay provided between the power supply and the plurality of inverters.

3. A motor control device according to claim 1, wherein:
   the current control means further comprises failure-time current control means for generating, when the primary failure detection means detects the primary failure, based on the target value and a detection value of a current flowing through the winding in the system in which the primary failure has occurred, a failure-time voltage command directed to the system in which the primary failure has occurred; and
   the current control means continues, when the primary failure detection means detects a failure, by the failure-time voltage command generated by the failure-time current control means, control for an inverter in a system in which the failure has occurred.

4. A motor control device according to claim 1, wherein:
   the secondary failure detection means determines whether a cause of the detected secondary failure is any one of a short-circuit failure and an open-circuit failure; and
   the current control means continues, when the secondary failure detection means determines that the cause of the secondary failure is an open-circuit failure, after the occurrence of the secondary failure, the control for the inverter on the normal side in which none of the primary failure and the secondary failure occurs.

5. A motor control device according to claim 1, wherein the current control means continues, when the primary failure detection means detects an open-circuit failure in any one of the plurality of sets of windings and the plurality of inverters and further the secondary failure detection means detects the secondary failure in any one of the winding and the inverter in the system in which the primary failure has occurred, after the occurrence of the secondary failure, the control for the inverter on the normal side in which none of the primary failure and the secondary failure occurs.

6. A motor control device according to claim 1, wherein the secondary failure detection means detects the secondary failure based on a current detection value, and any one of the target value and the voltage command in the each of the phases of the plurality of sets of windings.

7. A motor control device according to claim 1, wherein the secondary failure detection means detects the secondary failure based on a difference in a current detection value, and a difference in any one of the target value and the voltage command in the each of the phases of the plurality of sets of windings.

8. A motor control device according to claim 1, wherein:
   the current control means is configured to:
      when the primary failure detected by the primary failure detection means is a short-circuit failure, carry out short-circuit-failure current control suitable for the short-circuit failure; and
      when the primary failure detected by the primary failure detection means is an open-circuit failure, carry out open-circuit-failure current control suitable for the open-circuit failure; and
   the secondary failure detection means detects the secondary failure depending on a state of the current control based on an existing primary failure.

9. An electric power steering device using the motor control device according to claim 1.

10. A current control method applied to a motor control device for supplying from a power supply and controlling a current to flow through a motor provided with a plurality of sets of windings,
   the motor control device comprising:
      a plurality of inverters comprising a switching element in each of phases of the plurality of sets of windings for controlling a voltage to be applied to the each of the phases, thereby controlling a current to be supplied from the power supply to the each of the phases of the plurality of sets of windings;

a power supply relay provided between the power supply and the plurality of inverters for disconnecting an electrical connection; and current control means for providing, depending on a target value of a torque to be generated by the motor, each of the plurality of inverters with a voltage command corresponding to the voltage, thereby controlling the current to flow through the plurality of sets of windings, the current control method comprising:

detecting, by the current control means, a primary failure of any one of the plurality of sets of windings and the plurality of inverters;

detecting, by the current control means, after a the primary failure is detected, a secondary failure occurring in any one of a winding and an inverter in a system in which the primary failure has occurred;

continuing, by the current control means, when in any one of the plurality of inverters and a part of the plurality of sets of windings, any one of a short-circuit failure, a ground-fault failure, and a power-supply-fault failure is detected in the detecting a primary failure as the primary failure, control for an inverter on a normal side; and opening, by the current control means, when the secondary failure is detected in the detecting a secondary failure, the power supply relay.

\* \* \* \* \*